US005501904A

United States Patent [19]
Noda et al.

[11] Patent Number: 5,501,904
[45] Date of Patent: Mar. 26, 1996

[54] COATING AGENTS

[75] Inventors: Ippei Noda; Masami Ishikawa, both of Aichi, Japan

[73] Assignee: Takemoto Yushi Kabushiki Kaisha, Japan

[21] Appl. No.: 362,088

[22] Filed: Dec. 22, 1994

Related U.S. Application Data

[62] Division of Ser. No. 218,870, Mar. 28, 1994, Pat. No. 5,405,691, which is a continuation of Ser. No. 970,574, Nov. 3, 1992, abandoned.

[30] Foreign Application Priority Data

Nov. 7, 1991 [JP] Japan ................... 3-321316

[51] Int. Cl.$^6$ ........................................... B32B 5/16
[52] U.S. Cl. ..................... 428/331; 428/339; 428/447; 428/451; 428/480; 524/837
[58] Field of Search .................................. 524/588, 837; 428/331, 447, 480, 339, 451

[56] References Cited

U.S. PATENT DOCUMENTS

| | | | |
|---|---|---|---|
| 4,624,900 | 11/1986 | Fau | 524/588 |
| 4,690,986 | 9/1987 | Sasaki et al. | 525/479 |
| 4,968,746 | 11/1990 | Derudder et al. | 525/63 |
| 5,045,595 | 9/1991 | Wang | 525/479 |
| 5,122,562 | 6/1992 | Jeram et al. | 524/588 |
| 5,128,206 | 7/1992 | Fiard et al. | 428/337 |
| 5,370,930 | 12/1994 | Ito | 428/447 |

*Primary Examiner*—Mark D. Sweet
*Attorney, Agent, or Firm*—Majestic, Parsons, Siebert & Hsue

[57] ABSTRACT

Coating agents to be applied onto base materials such as thermoplastic resin films to provide improved surface characteristics include an aqueous emulsion of polysiloxane-polyvinyl graft copolymer essentially of specified kinds of siloxane units.

14 Claims, No Drawings

COATING AGENTS

This is a divisional of application Ser. No. 08/218,870 filed Mar. 28, 1994, now U.S. Pat. No. 5,405,691, which is a continuation of application Ser. No. 07/970,574 filed Nov. 3, 1992, now abandoned.

BACKGROUND OF THE INVENTION

This invention relates to coating agents.

Base films such as thermoplastic resin films used for and/or as magnetic memory media, lapping materials, electrical and electronic materials, letterpress printing materials, paints, photographic materials, thermal ink transfer recording materials, thermal painting materials, etc. are required to possess surface characteristics such as smoothness, water and oil repellency, releasing property and anti-foulness. Prior art methods of providing such surface characteristics to base films include the following: (1) methods of applying a composition containing a polymerizable monomer and exposing to radiation or plasma; (2) methods of applying a coupling agent such as oligomer or silane; (3) methods of applying a composition obtained by adding a silicon-type graft copolymer to a coating agent with an organic solvent (Japanese Patent Publications Tokkai 58-154766 and 58-164656); and (4) methods of applying a composition obtained by adding a fluorine-type or silicon-type graft copolymer to an emulsion-type coating agent (Japanese Patent Publication Tokkai 60-243167). These prior art methods, however, had various drawbacks. The methods of type (1) require a special equipment and hence are uneconomical. The methods of type (2) result in inferior surface characteristics. The methods of type (3) are highly toxic and also result in inferior surface characteristics, and the methods of type (4) result in inferior surface characteristics because the composition to be applied is not homogeneous.

It is therefore an object of the present invention to eliminate such drawbacks of the prior art methods and to provide improved coating agents satisfying the requirements described above. In particular, the present invention relates to aqueous emulsion-type coating agents capable of providing improved surface characteristics to a thermoplastic resin film for thermal ink transfer recording or thermal printing materials.

SUMMARY OF THE INVENTION

The present inventors have discovered, as a result of diligent studies in view of the objects above, that coating agents composed of an aqueous emulsion of a graft copolymer having a special structure, obtained by graft polymerization of vinyl monomers to polyorganosiloxane, satisfy the required conditions. In other words, coating agents according to the present invention, with which the above and other objects can be accomlished, may be characterized as essentially consisting of an aqueous emulsion of polysilioxane-polyvinyl graft copolymer having specified kinds of siloxane units as its principal constituent units.

DETAILED DESCRIPTION OF THE INVENTION

The present invention relates to coating agents which may be characterized as comprising an aqueous emulsion of polysiloxane-polyvinyl graft copolymer having as its principal constituents siloxane unit (A) of one or more kinds selected from siloxane unit shown by Formula (1) given below and siloxane unit shown by Formula (2) given below, and siloxane unit (B) of one or more kinds selected from siloxane unit shown by Formula (3) given below, siloxane unit shown by Formula (4) given below and siloxane unit shown by Formula (5) given below, such that their molar ratio (siloxane unit (A))/(siloxane unit (B)) is in the range of 99/1–0/100 and that the amount of siloxane unit shown by Formula (2) and siloxane units shown by Formula (5) together is greater than 0.5 molar % of all siloxane units:

$$R^1_2SiO \qquad \text{Formula (1)}$$

$$\underset{\underset{A^1-B^1}{|}}{R^2SiO} \qquad \text{Formula (2)}$$

$$SiO_2 \qquad \text{Formula (3)}$$

$$R^3SiO_{3/2} \qquad \text{Formula (4)}$$

$$\underset{\underset{A^2-B^2}{|}}{SiO_{3/2}} \qquad \text{Formula (5)}$$

where $R^1$–$R^3$ are same or different substituted or non-substituted hydrocarbon group having a carbon atom directly connected to a silicon atom and not having radical polymerization property; $A^1$ is a divalent organic group having a carbon atom directly connected to a silicon atom and being connected to $B^1$; $A^2$ is a divalent organic group having a carbon atom directly connected to a silicon atom and being connected to $B^2$; $B^1$ and $B^2$ are a vinyl polymer block.

Polysiloxane-polyvinyl graft copolymers according to the present invention are polyorganosiloxanes each having vinyl polymer blocks and one or more siloxane units shown by Formula (2) and/or one or more siloxane units shown by Formula (5). Such polysiloxane-polyvinyl graft copolymers include those having both aforementioned siloxane units (A) and (B) as principal constituent units and those having only siloxane unit (B) as principal constituent unit. Those of the polysiloxane-polyvinyl graft copolymers having both siloxane units (A) and (B) as principal constituent units should contain siloxane unit (A) by 99 molar % or less with the sum of siloxane units (A) and (B) taken as 100 molar %, but the ratio of siloxane unit (A)/siloxane unit (B) should be more preferably 99/1– 80/20 (in molar ratio). Such polysiloxane-polyvinyl graft copolymers having both siloxane units (A) and (B) as principal constituent units should contain siloxane units shown by Formula (2) and/or siloxane units shown by Formula (5) by 0.5 molar % or more as a sum with respect to all siloxane units. Those of the polysiloxane-polyvinyl graft copolymers having only siloxane units (B) as principal constituent units should contain siloxane units shown by Formula (5) by 0.5 molar % or more with respect to all siloxane units.

In Formulas (1), (2) and (4), $R^1$–$R^3$ are substituted or non-substituted hydrocarbon groups having a carbon atom directly connected to a silicon atom and not having radical polymerization property. Examples of non-substituted such hydrocarbon group include alkyl groups, cycloalkyl groups, aryl group, alkylaryl groups and aralkyl groups, but alkyl groups with 1–4 carbon atoms such as methyl group, ethyl group and butyl group or phenyl group are preferred. Examples of substituting groups for substituted hydrocarbon group include halogen groups, epoxy group, cyano group and ureido group, but γ-glycidoxypropyl group, β-(3,4-epoxy)cyclohexylethyl group, γ-chloropropyl group and trifluoropropyl group are preferred. These non-substituted and substituted hydrocarbon groups may be used at any ratio with respect to each other.

In Formulas (2) and (5), $A^1$ and $A^2$ are divalent organic groups having a carbon atom directly connected to a silicon atom, being connected respectively to $B^1$ and $B^2$. $A^1$ and $A^2$ are important as groups for connecting a vinyl polymer block to polyorganosiloxane. Examples of $A^1$ and $A^2$ include ethylene group, propylene group, 3-oxo-4-oxa-1,7-heptanediyl group and 2-methyl-3-oxo-4-oxa-1,7-heptanediyl group In Formulas (2) and (5), $B^1$ and $B^2$ are a vinyl polymer block obtained by graft polymerization or graft copolymerization of vinyl monomers. Such $B^1$ and $B^2$ include not only vinyl polymer blocks obtained by graft polymerization or copolymerization of vinyl monomers not having fluorine-substituted group, but also vinyl polymer blocks obtained by graft polymerization or copolymerization of vinyl monomers having a fluorine-substituted group. It is to be noted that the vinyl polymer blocks obtained by graft polymerization or copolymerization of monomers, inclusive of those having a fluorine-substituted group, include not only vinyl polymer blocks obtained by graft polymerization or copolymerization of vinyl monomers having a fluorine-substituted group but also vinyl polymer blocks obtained by graft copolymerization of vinyl monomers having a fluorine-substituted group and those not having a fluorine-substituted group. They will hereinafter be referred to simply as vinyl polymer groups Examples of vinyl monomer not having a fluorine-substituted group, as referred to above, include (1) alkyl methacrylates such as methyl methacrylate, ethyl methacrylate, butyl methacrylate, isobutyl methacrylate, 2-ethylhexyl methacrylate and cyclohexyl methacrylate; (2) alkyl acrylates such as methyl acrylate, ethyl acrylate and butyl acrylate; (3) aromatic vinyl monomers such as styrene and α-methylstyrene; (4) vinyl esters such as vinyl benzoate and vinyl acetate, (5) vinyl monomers having an ionic group such as sodium styrene sulfonate, sodium allylsulfonate, sodium vinylsulfonate, methacryloyl oxyethyl trimethyl ammonium chloride, acrylic acid and methacrylic acid; (6) water-soluble vinyl monomers such as acrylamide, polyethyleneglycol methacrylate, and hydroxyethyl methacrylate; and (7) vinyl monomers having a reactive group such as glycidyl methacrylate and maleic anhydride. Those containing one kind or more selected from aromatic vinyl monomers, alkyl (meth)acrylates and acrylonitrile by 90 weight % or more are preferred. In particular, styrene, methyl (meth)acrylate and ethyl (meth)acrylate are preferred.

Examples of vinyl monomers having a fluorine-substituted group, as referred to above, include (1) fluoroalkyl acrylates such as 1H,1H,11H-eicosafluoro undecylacrylate, 1H,1H-heptafluoro butylacrylate, hexafluoro isopropyl acrylate, 1H,1H,5H-octafluoro pentylacrylate, 1H,1H-pentadecafluoro octylacrylate, 2,2,3,3-tetrafluoro propylacrylate and 2,2,2-trifluoro ethylacrylate; (2) fluoroalkyl methacrylates such as 1H,1H,11H-eicosafluoro undecyl methacrylate, 1H,1H-heptafluoro butylmethacrylate, hexafluoro isopropyl methacrylate, 1H,1H,5H-octafluoro pentylmethacrylate, 1H,1H-pentadecafluoro octylmethacrylate, 2,2,3,3,3-pentafluoro propylmethacrylate, 2,2,3,3-tetrafluoro propylmethacrylate, and 2,2,2-trifluoroethyl methacrylate; (3) α-fluoroalkyl acrylic acid esters such as 2,2,3,3-tetrafluoropropyl-2-(trifluoromethyl)propenoate, and 2,2,2-trifluoroethyl-2-(trifluoromethyl)propenoate; (4) α-fluoroalkylvinyl carboxylic acid esters such as 1-(trifluoromethyl)vinyl acetate; (5) fluorocarboxylic acid vinyl esters such as vinyl trifluoroacetate; (6) fluorine-substituted styrenes such as 3-fluorostyrene and 4-fluorostyrene; and (7) α-fluoroalkyl styrene such as α-trifluoromethyl styrene. Of the above, those not having a fluorine-substituted group or a fluoroalkyl group near a vinyl group are preferred because they are not much influenced from the electron-attracting effect of fluorine atoms or from the steric effect of fluoroalkyl groups, and also because they have superior graft polymerization and graft copolymerization properties. When use is made of both vinyl monomers not having a fluorine-substitute group and vinyl monomers having a fluorine-substituted group, those containing one or more kinds, each having a fluorine-substituted group, selected from aromatic vinyl monomers, vinyl carboxylate and alkyl (meth)acrylates by 2 weight % or more are preferred.

Although it has been stated above that the polysiloxane-polyvinyl graft copolymers according to the present invention may have both siloxane unit (A) and siloxane unit (B) as principal constituent units or only siloxane unit (B) as principal constituent unit, this is not intended to imply that the present invention also places any particular limitation on the kind of terminal groups which are constituent units of the polysiloxane-polyvinyl graft copolymers other than the aforementioned principal constituent units. Hydrogen, hydroxyl group and trimethylsilyl group, however, are preferred terminal groups, and trimethylsilyl group is particularly preferred.

Next, a method of producing an aqueous emulsion of polysiloxane-polyvinyl graft copolymer of the present invention will be explained. Firstly, a compound capable of forming a silanol group by hydrolysis (hereinafter referred to as a silanol group forming compound) is caused to undergo hydrolysis in the presence of an acid or alkali hydrolysis-inducing catalyst inside an aqueous medium to produce a silanol compound. Next, an aqueous emulsion of polyorganosiloxane is generated by polycondensation of this silanol compound in the presence of a polycondensation catalyst such as an inorganic or organic acid. An appropriate surfactant may be used in reacting system for the hydrolysis of a silanol group forming compound and for the polycondensation of silanol compound in order to reduce the average particle size of this aqueous emulsion and to thereby generate a more stable aqueous emulsion. Lastly, vinyl monomers and a catalyst for radical polymerization are added to the aqueous emulsion of polyorganosiloxane for graft polymerization or graft copolymerization, thereby introducing vinyl or polymer blocks into polyorganosiloxane. This is how a desired aqueous emulsion of polysiloxane-polyvinyl graft copolymer can be obtained.

Examples of silanol group forming compound in the method described above include many kinds of alkoxy silane, chlorosilane, hydrogen silane, acyloxysilane and cyclosiloxane compounds. Silanol group forming compounds which form 2–4 silanol groups by hydrolysis are mainly used in the present invention, but silanol group forming compounds forming only one silanol group by hydrolysis may be used at 4 molar % or less with respect to the total amount of silanol group forming compounds for the purposes of adjusting the degree of polycondensation of the silanol compounds having silanol groups formed and also of introducing terminal groups. For the purpose of introducing vinyl polymer blocks to polyorganosiloxane as explained above, the present invention also teaches the use of the kind of silanol group forming compounds having a radical polymerizable group or in the molecule. Such silanol group forming compound having a radical polymerizable group should be less than 7.5 molar % of all silanol group forming compounds.

Examples of silanol group forming compound forming 4 silanol groups include tetramethoxysilane, tetraethoxysilane, tetrabutoxysilane and tetrachlorosilane. Examples of silanol group forming compound forming three silanol groups include methyl trimethoxysilane, methyl triethoxysilane, methyl triacetoxysilane, phenyl trimethoxysilane, methyl tris(dimethylamino)silane, methyl trichlorosilane, phenyl trichlorosilane, methyl dichloromethoxysilane, methyl dichlorohydrogene silane, methyl silane triol, methyl dichlorosilanol and methyl cholorosilane diol. Examples of silanol group forming compound forming two silanol groups include (1) silane compounds such as dimethyl dimethoxysilane, dimethyl dichlorosilane, dimethyl dihydrogene silane and dimethyl chlorosilanol; and (2) cyclosiloxane compounds such as octamethyl cyclotetrasiloxane. Examples of silanol group forming compound forming one silanol group include (1) silane compounds such as trimethyl methoxysilane, trimethyl chlorosilane and trimethylhydrogen silane; and (2) siloxane compounds such as hexamethyl disiloxane. Examples of silanol group forming compounds having a radical polymerizable group include (1) compounds forming 3 silanol groups such as methacryloyl oxypropyl•trimethoxysilane, vinyl•trimethoxysilane and allyl•trimethoxysilane vinyl.trimethoxysilane and allyl.trimethoxysilane (2) silane compounds forming two silanol groups such as methacryloyl oxypropyl•methyl•dimethoxysilane, vinyl•methyl•dimethoxysilane and allyl•methyl•diemthoxysilane and (3) silane compounds forming one silanol group such as methacryloyl oxypropyl•dimethyl•methoxysilane, vinyl•dimethyl•methoxysilane and allyl•dimethyl•methoxysilane Silanol group forming compounds having hydrocarbon groups substituted by a polar group such as glycidyl group, ureide group and amino group may be used at any desired ratios. It is preferable to use silanol group forming compounds having such substituted hydrocarbon groups within the range of 5–30 molar % with respect to all silanol group forming compounds because the average particle diameter of the obtained aqueous emulsion can be reduced and its stability can be further improved. Examples of silanol group forming compound having substituted hydrocarbon group include (1) silane compounds forming three silanol groups such as γ- glycidoxypropyl•trimethoxysilane, γ-ureidopropyl•trimethoxysilane N, N-dimethyl aminopropyl•trimethoxysilane; (2) silane compounds forming two silanol groups such as γ-glycidoxypropyl•methoxy•dimethoxysilane, γ-ureidopropyl•methyl•dimethoxysilane and N, N-dimethyl aminopropyl•methyl•dimethoxysilane; and (3) silane compounds forming one silanol group such as γ-glycidoxypropyl•dimethyl•methoxysilane, γ-ureidopropyl•dimethyl•methoxysilane and N, N-dimethyl aminopropyl•dimethyl•methoxysilane.

In order to produce an aqueous emulsion of polysiloxane-polyvinyl graft copolymer according to the present invention, silianol group forming compounds containing a radical polymerizable group by 0.5 molar % or more with respect to all siloxane units are caused to undergo hydrolysis inside an aqueous medium to produce silanol compounds and the silanol compounds and the silanol compounds thus obtained are caused to undergo polycondensation to produce polyorganosiloxane having radical polymerizable groups in the molecule as explained above. The aqueous medium to be used for this purpose should be a uniform solvent containing water by 30 weight % or more, and more preferably by 90 weight % or more. Examples of solvent which may be used besides water include water-soluble solvents such as methanol, ethanol, isopropanol, acetone and tetrahydrofuran.

The graft polymerization and graft copolymerization, whereby vinyl or polymer blocks are introduced into polyorganosiloxane thus obtained are carried out by adding a radical polymerization catalyst and vinyl monomers to an aqueous emulsion of polyorganosiloxane and stirring the mixture in an atmosphere of an inactive gas. This reaction may be carried out within the range of temperature between room temperature and the boiling point of the vinyl monomer to be used. In situations where vinyl monomers are connected through radical polymerizable carbon-carbon double bonds at the time of, graft polymerization or graft copolymerization, what is obtained is an aqueous emulsion of a polysiloxane-polyvinyl graft copolymer having these vinyl monomers, graft polymerized or graft copolymerized according to the relative proportions at which they were used.

The weight ratio (polyorganosiloxane part)/(graft polymerized or graft copolymerized vinyl part) should preferably be in the range of 99/1–22/78 from the point of view of physical characteristics. In order to provide still better characteristics to a coating agent comprising such an aqueous emulsion of polysiloxane-polyvinyl graft copolymer, the average size of the particles contained therein should be 0.01–0.5 µm, and more preferably 0.02–0.3µm.

There is no limitation imposed on the concentration of polysiloxane-polyvinyl graft copolymer contained in the aqueous emulsion. From the point of view of advantages in production and stability, however, those in the range of 5–50 weight % are considered preferred. When such an aqueous emulsion is actually used, it is diluted with water until an appropriate concentration is obtained and it is then applied onto a base material such as a film or a sheet of various kinds by using a known method such as roller coating or spray coating.

Among the base materials on which the coating agents of the present invention may be applied, polyester films and sheets are most preferred. In such an application, surface characteristics such as flatness, water and oil repellency, anti-blocking and anti-foulness can be provided to an even higher degree. When a coating agent according to the present invention is applied to a polyester film or a polyester sheet, the aqueous emulsion, of which the coating agent is comprised, is normally diluted with water such that the concentration of the polysiloxane-polyvinyl graft copolymer contained therein becomes 0.1–10 weight %, or more preferably 1–5 weight %, and then applied by a known method such as roller coating or spray coating. In the production process of a polyester film or sheet, the coating step may be carried out before that of orientation immediately after melt extrusion, before diaxial orientation after uniaxial orientation, or after diaxial orientation, but it is preferable to carry out this step before diaxial orientation after uniaxial orientation. No matter in which step the coating is to be carried out, the rate of coating is usually 0.01–0.2 g as polysiloxane-polyvinyl graft copolymer per $1m^2$ of the polyester film or sheet as final product.

Demonstrative Experiments—Part 1

An aqueous emulsion of each of the examples described below was prepared. The average particle sizes (or average diameters) and dispersion stability of these aqueous emulsions are shown in Table 1. The average diameters were measured by a dynamic light-scattering method with an electrophoresis and dynamic light-scattering photometer (Model ELS-800 produced by Otsuka Denshi Co., Ltd.). Dispersion stability of each aqueous emulsion was evaluated by placing it inside a sealed glass container, leaving it quietly and observing whether or not a precipitation layer was formed at the bottom of the container and whether or not a clear supernatant layer was formed at the top. The following standards were used in the evaluation of dispersion stability:

A: Neither precipitation nor supernatant layer was observed even after a month.

B: Either a precipitation or supernatant layer was observed within one week to one month.

C: Either a precipitation or supernatant layer was observed within two days to one week.

D: Either a precipitation or supernatant layer was observable one day later.

Test Example 1

Ion exchange water 1080 g was placed inside a reaction vessel and 0.2 g of acetic acid was added thereto to obtain a uniform solution. Added to this solution were 1333 g (9.78 mole) of methyl trimethoxysilane, 27 g (0.11 mole) of γ-methacryloxypropyl trimethoxysilane and 394 g (1.67 mole) of γ-glycidoxypropyl trimethoxysilane to carry out hydrolysis with temperature kept at 30° C. A transparent reaction liquid containing silanol compound was obtained in about 30 minutes. Next, 475 g of ion exchange water and 50 g of dodecylbenzene sulfonic acid were taken in another reaction vessel. After it was well dissolved, the temperature was adjusted to 80°–85° C. and 300 g of the reaction liquid obtained as described above was dropped into this solution over a period of about 2 hours. After 15 minutes of curing, it was cooled gradually and stirred for 1 hour until room temperature was reached. After the reaction was completed, its pH value was adjusted to 7.0 with an aqueous solution of sodium carbonate to obtain an aqueous emulsion of non-linear polyorganosiloxane. The average diameter of microparticles of non-linear polyorganosiloxane contained in this aqueous emulsion was 0.08 μm. Potassium persulfate 1 g and ion exchange water 163 g were added to the aqueous emulsion thus obtained, its temperature was adjusted to 70°–75° C. in a nitrogen atmosphere and 47.2 g of styrene was dropped in over a period of about 1 hour. Temperature was kept at the same level for about 3 hours thereafter to complete polymerization. The polysiloxane-polyvinyl graft copolymer in the aqueous emulsion thus obtained was in the form of spherical solid particles and their average diameter was 0.09 μm. In this aqueous emulsion, the concentrations of solid components and of polysiloxane-polyvinyl graft copolymer were respectively 20% and 15.2%.

Test Example 2

Octamethyl cyclotetrasiloxane 100 g (0.34 mole) was added to ion exchange water 300 g into which sodium dodecylbenzene sulfonate 1 g had already been dissolved and, after the mixture was preliminarily stirred at 10000 rpm by a homo-mixer, it was emulsified and dispersed by passing it through a homogenizer three times at pressure of 350 kg/cm$^2$. To this were added 780 g of ion exchange water and 0.2g of formic acid, and the mixture was stirred at 20° C. for 30 minutes. As this was being stirred at 20° C., methyl trimethoxysilane 1200 g (8.8 mole), γ-methacryloxypropyl trimethoxysilane 27 g (0.11 mole) and γ-glycidoxypropyl trimethoxysilane 120 g (0.51 mole) were added for hydrolysis while temperature was maintained at 30° C. A reaction liquid containing a silanol compound was thus obtained in about 30 minutes. Next, ion exchange water 475 g and lauryl dimethylhydroxyethyl ammonium hydroxide 32.6 g were placed inside another reaction vessel. After it was well dissolved, its temperature was adjusted to 80°–85° C., and 300 g of the reaction liquid obtained as described above was dropped into it over a period of about 2 hours. After 15 minutes of curing, it was gradually cooled and stirred for 1 hour until room temperature was reached. After the reaction was completed, the pH value was adjusted to 7.0 with a weak aqueous solution of hydrochloric acid to obtain an aqueous emulsion of non-linear polyorganosiloxane. The average diameter of particles of non-linear polyorganosiloxane contained in this aqueous emulsion was 0.10 μm. Potassium persulfate 1 g and ion exchange water 1725 g were added to this aqueous emulsion, its temperature was adjusted to 70°–75° C. within an atmosphere of nitrogen, and a mixed monomer of ethyl acrylate 132 g and methyl acrylate 57g was dropped into it over a period of about 1 hour. Thereafter, its temperature was kept at the same level for about 3 hours to complete polymerization. The polysiloxane-polyvinyl graft copolymer in the aqueous emulsion thus obtained was in the form of spherical solid particles, of which the average diameter was 0.14 μm. In this aqueous emulsion, the concentrations of solid components and of polysiloxane-polyvinyl graft copolymer were respectively 20% and 18.8%

Test Example 3

The same process as in Test Example 1 was carried out except 394 g of γ-glycidoxypropyl trimethoxysilane therein was substituted by γ-glycidoxypropyl trimethoxysilane 191 g (0.81 mole) and tetraethyl silicate 187 g (0.90 mole). The polysiloxane-polyvinyl graft copolymer in the aqueous emulsion thus obtained was nearly spherical with average diameter 0.05 μm. In this aqueous emulsion, the concentrations of solid components and of polysiloxane-polyvinyl graft copolymer were respectively 20% and 15.2%

Test Example 4

The same process as in Test Example 1 was carried out except 27 g of γ-methacryloxypropyl trimethoxysilane was substituted by γ-methacryloxypropyl methyl dimethoxysilane 34.8 g (0.15 mole). The polysiloxane-polyvinyl graft copolymer in the aqueous emulsion thus obtained was in the form of spherical solid particles and their average diameter was 0.08 μm. In this aqueous emulsion, the concentrations of solid components and of polysiloxane-polyvinyl graft copolymer were respectively 20% and 16.3%

Test Example 5

The same process as in Test Example 1 was carried out except 1333 g of methyl trimethoxysilane and 394 g of γ-glycidoxypropyl trimethoxysilane were substituted by methyl trimethoxysilane 1648 g (12.1 mole), 27 g of γ-methacryloxypropyl trimethoxysilane was changed to 36 g (0.15 mole), 50 g of dodecylbenzene sulfonic acid was changed to 80 g, and 47.2 g of styrene was changed to 62.5 g. The polysiloxane-polyvinyl graft copolymer in the aqueous emulsion thus obtained was in the form of spherical solid particles and their average diameter was 0.20 μm. In this aqueous emulsion, the concentrations of solid components and of polysiloxane-polyvinyl graft copolymer were respectively 24% and 16.6%

Test Example 6

Octamethyl cyclotetrasiloxane 97.7 g (0.33 mole), γ-glycidoxypropyl trimethoxysilane 4.6 g (19.6 millimole), and γ-methacryloxypropyl trimethoxysilane 2.0 g (8.1 millimole) were mixed together. After this mixture was added to 300 g of ion exchange water dissolving therein 1.0 g of dodecylbenzene sulfonic acid and a homo-mixer was used for dispersion, it was further uniformly emulsified by means of a homogenizer to obtain an aqueous emulsion of silanol compound. Next, dodecylbenzene sulfonic acid 31 g and ion exchange water 217 g were placed inside a flask and, after it has been well dissolved, the temperature was raised to 80°–85° C., the aqueous emulsion of silanol compound obtained as described above was dropped into it over a period of 2 hours. After this was completed, it was cured at 85° C. for 1 hour. After the curing was completed, it was cooled to room temperature and neutralized with sodium carbonate to complete polycondensation, thereby obtaining an aqueous emulsion of polyorganosiloxane. Lastly, ion exchange water 483 g and potassium persulfate 1.5 g were dissolved in the aqueous emulsion of polyorganosiloxane obtained as described above, this mixture was placed inside a flask and heated to 70° C. while nitrogen was passed inside the flask, and styrene 100 g was slowly dropped. After this was done, it was cured for 3 hours and an aqueous emulsion of polysiloxane-polyvinyl graft copolymer was obtained. The average diameter of polysiloxane-polyvinyl graft copolymer contained in this aqueous emulsion was 0.06 μm. The concentrations of solid components and of polysiloxane-polyvinyl graft copolymer in this aqueous emulsion were respectively 19.1% and 16.3%

Test Example 7

Octamethyl cyclotetrasiloxane 100.6 g (0.34 mole), hexamethyl disiloxane 1.6 g (0.01 mole) and γ-methacryloxypropyl trimethoxysilane 3.3 g (13.3 millimole) were mixed together. This mixture was added to 315 g of ion exchange water dissolving therein 1.1 g of dodecylbenzene sulfonic acid and, after it was dispersed by means of a homo-mixer, a homogenizer was used to further uniformly emulsify it, thereby obtaining 421 g of aqueous emulsion of a silanol compound. Next, the aqueous emulsion of silanol compound was placed inside a flask and, after polycondensation at 80° C. for 5 hours, it was gradually cooled for 16 hours, neutralized with a saturated water solution containing 0.32 g of sodium carbonate, and filtered to obtain an aqueous emulsion of polyorganosiloxane. Lastly, the aqueous emulsion of polyorganosiloxane obtained as described above was placed inside a flask, 1.6 g of potassium persulfate and 400 g of ion exchange water were added and the mixture was heated to 70° C. After the interior of the flask was replaced with nitrogen, styrene 45 g (0.43 mole) was dropped in over a period of 2 hours. After this was done, it was heated to 80° C. and cured for 4 hours. It was cooled to 40° C. and filtered, and an aqueous emulsion of polysiloxane-polyvinyl graft copolymer was obtained. The average diameter of polysiloxane-polyvinyl graft copolymer contained in this aqueous emulsion was 0.30 μm. The concentrations of solid components and of polysiloxane-polyvinyl graft copolymer in this aqueous emulsion were respectively 16.9% and 16.8%

Test Example 8

Octamethyl cyclotetrasiloxane 204.2 g (0.69 mole), γ-glycidoxypropyl trimethoxysilane 20.2 g (0.885 mole) and γ-methacryloxypropyl trimethoxysilane 4.8 g (19.3 millimole) were mixed together. This mixture was added to 750 g of ion exchange water dissolving therein 2.5 g of dodecylbenzene sulfonic acid and, after it was dispersed by means of a homomixer, a homogenizer was used to further uniformly emulsify it, thereby obtaining an aqueous emulsion of silanol compound. Next, dodecylbenzene sulfonic acid 77.5 g and ion exchange water 542.5 g were placed inside a flask and, after it was well dissolved, the temperature was raised to 80°–85° C. and it was dropped into the aqueous emulsion of silanol compound obtained as described above over a period of 2 hours. This was cured thereafter at 85° C. for 1 hour. After the completion of the curing process, it was cooled to room temperature and neutralized with sodium carbonate to complete polycondensation to obtain an aqueous emulsion of polyorganosiloxane. Lastly, ion exchange water 725 g and potassium persulfate 2.3 g were dissolved in the aqueous emulsion of polyorganosiloxane obtained as described above. The solution was placed inside a flask and heated to 70° C. while nitrogen was passed within the flask, and vinyl trifluoroacetate 224.9 g (1.61 mole) was slowly dropped. This was cured thereafter for 3 hours to obtain an aqueous emulsion of polysiloxane-polyvinyl graft copolymer. The average diameter of polysiloxane-polyvinyl graft copolymer contained in this aqueous emulsion was 0.26 μm. The concentrations of solid components and of polysiloxane-polyvinyl graft copolymer in this aqueous emulsion were respectively 20.8% and 17.5%

Test Example 9

Octamethyl cyclotetrasiloxane 97.7 g (0.33 mole), hexamethyl disiloxane 1.8 g (11.1 millimole), γ-methacryloxypropyl trimethoxysilane 6.4 g (25.8 millimole) and dodecylbenzene sulfonic acid 2.8 g were dissolved in 234 g of ion exchange water to obtain an aqueous emulsion of polyorganosiloxane as done in Test Example 8. Next, the aqueous emulsion of polyorganosiloxane obtained as described above, potassium persulfate 2.5 g, ion exchange water 967.5 g, methyl methacrylate 50.0 g and 4-fluorostyrene 25.0 g were used to obtain an aqueous emulsion of polysiloxane-polyvinyl graft copolymer as done in Test Example 8. The average diameter of polysiloxane-polyvinyl graft copolymer contained in this aqueous emulsion was 0.22 μm. The concentrations of solid components and of polysiloxane-polyvinyl graft copolymer in this aqueous emulsion were respectively 13.1% and 12.9%

Comparison Example 1

Ion exchange water 288 g was placed inside a reaction vessel, dodecylbenzene sulfonic acid 50g was added to produce a uniform solution, and it was heated to 60° C. Into this was dropped a liquid mixture of methyl trimethoxysilane 170 g (1.25 mole) and γ-glycidoxypropyl trimethoxysilane 2.8 g (0.012 mole) over a period of 3 hours. This was continuously stirred at 60° C. for 12 hours and neutralized with an aqueous solution of sodium carbonate to obtain an aqueous emulsion of polyorganosiloxane. Polyorganosiloxane contained in this aqueous emulsion was in the form of spherical solid particles as a whole, and their average diameter was 0.90 μm but there were also particles with indefinite shapes and agglomerated particles in addition to the spherical particles. The concentration of solid components and of polyorganosiloxane in this aqueous emulsion were respectively 27.2% and 16.8%.

Comparison Example 2

Ion exchange water 300 g was placed inside a reaction vessel and dodecylbenzene sulfonic acid 1 g was added to produce a uniform solution. Added thereto were octamethyl cyclotetrasiloxane 98.9g (0.35 mole) and γ-glycidoxypropyl methyl dimethoxysilane 4.2g (0.019 mole) and, after it was preliminarily stirred by means of rotary stirrer vanes, a homogenizer was used to produce an emulsion. This emulsion was shifted into a reaction vessel and its temperature was raised with stirring to carry out hydrolysis and polycondensation at 80°–85° C. for 7 hours. After it was cooled to room temperature, it was neutralized with a water solution of sodium hydrogen carbonate to obtain an aqueous emulsion of polyorganosiloxane. The average diameter of polyorganosiloxane contained in this aqueous emulsion was over 5 μm and large rough particles greater than 100 μm were observed. The concentrations of solid components and of polyorganosiloxane in this aqueous emulsion were respectively 25.5% and 25.2%

Comparison Example 3

Polydimethylsiloxane (average molecular weight=5000) 100 g with one terminal modified with methacryloyl oxypropyl group as dissolved in 500 g of xylene and placed inside a flask together with 0.2 g of azobisisobutylnitrile, and it was heated to 70° C. After the interior of the flask was replaced with nitrogen, methyl methacrylate 100 g was dropped over a period of 2 hours and it was cured thereafter at 80° C. for 4 hours. After the curing process, it was gradually cooled, reprecipitated with excess methanol and filtered. The solid body 100 g obtained by drying the filtered solid component was added to ion exchange water 850 g dissolving therein 50 g of sodium dodecylbenzene sulfonate to obtain an aqueous emulsion by emulsifying it by means of a homogenizer.

Comparison Example 4

Straight chain polydimethylsiloxane (average molecular weight=10000) 15 g and sodium dodecylbenzene sulfonate 2 g were dissolved in 88 g of ion exchange water and emulsified with a homogenizer to obtain an aqueous emulsion.

Comparison Example 5

Ion exchange water 2000 g was placed inside a reaction vessel and dodecylbenzene sulfonic acid 4 g was added thereto to produce a uniform solution. Added to this solution were octamethyl cyclotetrasiloxane 395.6 g (1.4 mole) and γ-methacryloxypropyl trimethoxysilane 1.4 g (5.6 millimole) and, after it was preliminarily stirred with rotary stirrer vanes, an emulsion was produced with a homogenizer. This emulsion was shifted into a reaction vessel and its temperature was raised with stirring for hydrolysis and polycondensation at 80°–85° C. for 7 hours. After it was cooled to room temperature, it was neutralized with sodium hydrogen carbonate to obtain an aqueous emulsion of polyorganosiloxane. Potassium persulfate 2 g was added to the aqueous emulsion of polyorganosiloxane obtained as described above and it was stirred for 20 minutes. After styrene 100 g was dropped over a period of 30 minutes at 65°–70° C. while nitrogen gas was flowed, it was maintained at 65°–70° C. for 4 hours to complete polymerization. The average diameter of polysiloxane-polyvinyl graft copolymer was over 5 μm. The concentrations of solid components and of polysiloxane-polyvinyl graft copolymer in this aqueous emulsion were respectively 20% and 19.9%.

Demonstrative Experiments—Part 2

Polyethylene terephthalate, with limiting viscosity 0.62 as measured inside orthochlorophenol at 25° C. and containing absolutely no inorganic filler, was extruded from a nozzle by an extruder and was made into an extruded film of thickness 152 μ while applying an electrostatic field on a drum cooled to 40° C. This was subsequently drawn longitudinally by a factor of 3.6 on a metallic roll heated to 93° C. to obtain a uniaxially drawn film. Next, each aqueous emulsion obtained as described above in Part 1 was uniformly applied on one side of this uniaxially drawn film from the head of a coater with three rolls at a position immediately before the film reached a tenter. The amount of dry paint at this moment was adjusted to about 2.3 g per 1 μm$^2$ of the film. This amount corresponded to about 0.0129 g per 1 μm$^2$ of the diaxially drawn film to be described below. Lastly, the one-side coated uniaxially drawn film was guided into the tenter wherein it was drawn transversely by a factor of 3.5 at 101° C. and further thermally set for 6.3 seconds at 225° C. to obtain a diaxially drawn film. The total time of heating after the film was coated on one side was 11 seconds. This diaxially drawn film could be wound up without generating any wrinkles with winding tension of 9.8 kgf applied thereto. This diaxially drawn film was also micro-slit to produce 52 wound tapes of width ½ inch and weight 500 mg. This micro-slitting process could be performed with no difficulty. Paintability of each aqueous emulsion prepared in Part 1, as well as external appearance, water contact angle, coefficient of friction and anti-blocking property of each diaxially drawn film, is shown in Table 2. In Table 2, paintability was evaluated by visually inspecting the wetting condition of the aqueous emulsion when it is applied to one side of the uniaxially drawn film and the uniformity of coating formed on the diaxially drawn film. The standard of evaluation was as follows:

A: No spots are observed at all.

B: A few spots are observed.

C: Spots are conspicuously observed.

For the evaluation of external appearance of the films, transparency of diaxially drawn films was visually inspected. The standard of evaluation was as follows:

A: Entire surface is as transparent as uncoated film.

B: A part with inferior transparency is observed

C: Entire surface is non-transparent.

For the measurement of water contact angle, a water drop was deposited on the diaxially drawn film under the condition of 23° C. and 65% RH and use was made of a goniometer (produced by Production Technology Laboratory, Tokyo University). For the measurement of coefficient of friction, humidity conditioning of the diaxially drawn film was carried out at 23° C. and 65% RH and the coefficient of friction (μd) against a satin surface of a stainless steel plate was measured under the same conditions by means of a friction-measuring instrument (Model TR produced by Toyo Seiki Co., Ltd. with load 200 g and speed 300 mm/minute). For the measurement of releasing property, an adhesive tape was attached to the coated surface of the diaxially drawn film and, after it was cut to the width of 20 mm, the releasing strength was measured by a tension meter.

As can be seen from Tables 1 and 2, the present invention can provide surface characteristics such as high level of flatness, water and oil repellency, releasing and anti-foulness properties to a base material such as a thermoplastic resin film without requiring any special equipment, economically and without toxicity.

TABLE 1

| Example | Average Diameter (μm) | Dispersion Stability |
|---|---|---|
| Test Example | | |
| 1 | 0.09 | A |
| 2 | 0.14 | B |
| 3 | 0.05 | A |
| 4 | 0.08 | A |
| 5 | 0.20 | B |
| 6 | 0.06 | A |
| 7 | 0.30 | B |
| 8 | 0.26 | B |
| 9 | 0.22 | B |
| Comparison Example | | |
| 1 | 0.90 | C |
| 2 | >5.00 | C |
| 3 | 1.10 | C |
| 4 | 0.78 | C |
| 5 | >5.00 | C |

TABLE 2

| Aqueous Emulsion | Paintability | External Appearance | Water Contact Angle(°) | Coef. of Friction | Releasing (g/20 mm) |
|---|---|---|---|---|---|
| Test Examples: | | | | | |
| 1 | A | A | 110 | 0.12 | 4 |
| 2 | A | A | 115 | 0.11 | 7 |
| 3 | A | A | 113 | 0.15 | 5 |
| 4 | A | A | 120 | 0.09 | 25 |
| 5 | A | A | 118 | 0.17 | 10 |
| 6 | A | A | 116 | 0.16 | 8 |
| 7 | A | A | 105 | 0.10 | 9 |
| 8 | A | A | 122 | 0.09 | 5 |
| 9 | A | A | 125 | 0.10 | 2 |
| Blank | — | — | 72 | 0.44 | 710 |
| Comparison Examples: | | | | | |
| 1 | C | C | 90 | 0.35 | 350 |
| 2 | C | C | 85 | 0.40 | 400 |
| 3 | C | C | 95 | 0.30 | 300 |
| 4 | C | C | 98 | 0.40 | 250 |
| 5 | C | C | 83 | 0.31 | 290 |

What is claimed is:

1. A coating agent comprising an aqueous emulsion of polysilane-polyvinyl graft copolymer consisting essentially of siloxanep unit including at least one kind selected from the group consisting of units of first kind given by Formula (1), units of second kind given by Formula (2) and units of third kind given by Formula (3); said units of third kind which are included being equal to or greater than 0.5 molar % of the total of said units that are included; said Formulas (1) through (3) being given by:

$$SiO_2 \quad \text{Formula (1)}$$
$$R^3SiO_{3/2} \quad \text{Formula (2)}$$
$$\underset{|}{SiO_{3/2}} \quad \text{Formula (3)}$$
$$A^2-B^2$$

where $R^3$ is substituted or non-substituted hydrocarbon group having a carbon atom directly connected to a silicon atom, not having radical polymerization property and having substituting group for said substituted hydrocarbon group, said substituting group being selected from the group consisting of halogen group, epoxy group, cyano group and ureido group; $A^2$ is a divalent organic group having a carbon atom directly connected to a silicon atom and being connected to $B^2$; and $B^2$ is a vinyl polymer block.

2. The coating agent of claim 1 wherein said $B^2$ in said Formula (3) is a vinyl polymer block obtained by graft polymerization of vinyl monomers containing one or more kinds selected from the group consisting of aromatic vinyl monomers and alkyl (meth)acrylates.

3. The coating agent of claim 1 wherein said $B^2$ in said Formula (3) is a vinyl polymer block obtained by graft polymerization of vinyl monomers containing 2 weight % or more by weight of one or more kinds selected from the group consisting of aromatic vinyl monomers, vinyl carboxylates and alkyl (meth)acrylates, each having a fluorine-substituted group.

4. The coating agent of claim 1 wherein the average diameter of particles of said polysiloxane-polyvinyl graft copolymer is 0.01–0.5 μm.

5. The coating agent of claim 1 which is capable of being applied on a polyester film.

6. The coating agent of claim 1 which is capable of being applied on a polyester sheet.

7. A coated film comprising a coating agent and a polyester film, said coating agent being applied on said polyester film, said coating agent comprising an aqueous emulsion of polysiloxane-polyvinyl graft copolymer consisting essentially of siloxane unit including at least one kind selected from the group consisting of units of first kind given by Formula (1), units of second kind given by Formula (2) and units of third kind given by Formula (3); said units of third kind which are included being equal to or greater than 0.5 molar % of the total of said units that are included; said Formulas (1) through (3) being given by:

$$SiO_2 \quad \text{Formula (1)}$$
$$R^3SiO_{3/2} \quad \text{Formula (2)}$$
$$\underset{|}{SiO_{3/2}} \quad \text{Formula (3)}$$
$$A^2-B^2$$

where $R^3$ is substituted or non-substituted hydrocarbon group having a carbon atom directly connected to a silicon atom, not having radical polymerization property and having substituting group for said substituted hydrocarbon group, said substituting group being selected from the group consisting of halogen group, epoxy group, cyano group and ureido group; $A^2$ is a divalent organic group having a carbon atom directly connected to a silicon atom and being connected to $B^2$; and $B^2$ is a vinyl polymer block.

8. The coated film of claim 7 wherein said $B^2$ in said Formula (3) is a vinyl polymer block obtained by graft polymerization of vinyl monomers containing one or more kinds selected from the group consisting of aromatic vinyl monomers and alkyl (meth)acrylates.

9. The coated film of claim 7 wherein said $B^2$ in said Formula (3) is a vinyl polymer block obtained by graft polymerization of vinyl monomers containing 2 weight % or more by weight of one or more kinds selected from the group consisting of aromatic vinyl monomers, vinyl carboxylates and alkyl (meth)acrylates, each having a fluorine-substituted group.

10. The coated film of claim 7 wherein the average diameter of particles of said polysiloxane-polyvinyl graft copolymer is 0.01– 0.5 μm.

11. A coated sheet comprising a coating agent and a polyester sheet, said coating agent being applied on said polyester sheet, said coating agent comprising an aqueous emulsion of polysiloxane-polyvinyl graft copolymer consisting essentially of siloxane unit including at least one kind selected from the group consisting of units of first kind given by Formula (1), units of second kind given by Formula (2) and units of third kind given by Formula (3); said units of third kind which are included being equal to or greater than 0.5 molar % of the total of said units that are included; said Formulas (1) through (3) being given by:

$$SiO_2 \quad \text{Formula (1)}$$
$$R^3SiO_{3/2} \quad \text{Formula (2)}$$
$$\begin{array}{c} SiO_{3/2} \\ | \\ A^2-B^2 \end{array} \quad \text{Formula (3)}$$

where $R^3$ is substituted or non-substituted hydrocarbon group having a carbon atom directly connected to a silicon atom, not having radical polymerization property and having substituting group for said substituted hydrocarbon group, said substituting group being selected from the group consisting of halogen group, epoxy group, cyano group and ureido group; $A^2$ is a divalent organic group having a carbon atom directly connected to a silicon atom and being connected to $B^2$; and $B^2$ is a vinyl polymer block.

12. The coated sheet of claim 11 wherein said $B^2$ in said Formula (3) is a vinyl polymer block obtained by graft polymerization of vinyl monomers containing one or more kinds selected from the group consisting of aromatic vinyl monomers and alkyl (meth)acrylates.

13. The coated sheet of claim 11 wherein said $B^2$ in said Formula (3) is a vinyl polymer block obtained by graft polymerization of vinyl monomers containing 2 weight % or more by weight of one or more kinds selected from the group consisting of aromatic vinyl monomers, vinyl carboxylates and alkyl (meth)acrylates, each having a fluorine-substituted group.

14. The coated sheet of claim 11 wherein the average diameter of particles of said polysiloxane-polyvinyl graft copolymer is 0.01– 0.5 μm.

* * * * *